United States Patent
Colosimo et al.

(10) Patent No.: US 10,647,417 B2
(45) Date of Patent: May 12, 2020

(54) METHODS AND CONTROL SYSTEMS FOR CONTROLLING A DRIVE SYSTEM OF AN AIRCRAFT

(71) Applicants: Airbus Operations Limited, Bristol (GB); Airbus Operations SAS, Toulouse (FR)

(72) Inventors: Antonio Colosimo, Bristol (GB); Lukasz Sznajder, Bristol (GB); Xavier Guery, Toulouse (FR)

(73) Assignees: AIRBUS OPERATIONS LIMITED, Bristol (GB); AIRBUS OPERATIONS SAS, Toulouse (FR)

( * ) Notice: Subject to any disclaimer, the term of this patent is extended or adjusted under 35 U.S.C. 154(b) by 481 days.

(21) Appl. No.: 15/207,536

(22) Filed: Jul. 12, 2016

(65) Prior Publication Data
US 2017/0015410 A1    Jan. 19, 2017

(30) Foreign Application Priority Data

Jul. 13, 2015   (GB) .................................. 1512196.5

(51) Int. Cl.
*B64C 19/00*   (2006.01)
*B64C 25/40*   (2006.01)

(52) U.S. Cl.
CPC ............ *B64C 25/405* (2013.01); *B64C 19/00* (2013.01); *B60L 2200/10* (2013.01); *Y02T 50/823* (2013.01)

(58) Field of Classification Search
CPC ..... B64C 25/405; B64C 19/00; Y02T 50/823; B60L 2200/10
See application file for complete search history.

(56) References Cited

U.S. PATENT DOCUMENTS

| | | | | |
|---|---|---|---|---|
| 8,897,930 B2 * | 11/2014 | Bayer | ...................... | G05D 1/02 244/103 R |
| 8,924,040 B2 * | 12/2014 | Edelson | ................ | B64C 25/405 180/904 |
| 9,658,621 B2 * | 5/2017 | Fusaro | .................. | G05D 1/0202 |
| 2005/0007044 A1 * | 1/2005 | Qiu | ...................... | G05B 13/048 318/400.02 |
| 2006/0065779 A1 * | 3/2006 | McCoskey | ................ | B64F 1/32 244/100 R |

(Continued)

FOREIGN PATENT DOCUMENTS

WO   2012061532 A1   5/2012

OTHER PUBLICATIONS

UKIPO Search Report dated Jan. 8, 2016 Great Britain Application No. 1512196.5.

(Continued)

*Primary Examiner* — Brian M O'Hara
*Assistant Examiner* — Keith L Dixon
(74) *Attorney, Agent, or Firm* — Nixon & Vanderhye P.C.

(57) ABSTRACT

A method of controlling a drive system of an aircraft. The drive system comprised a drive motor arranged to drive at least one wheel of an aircraft landing gear. A power signal indicative of a power level for the drive motor and a speed signal indicative of a rotation speed of the drive motor are received. A torque level for the drive motor is determined using the power signal and the speed signal. The drive motor is then driven such that the torque generated by the drive motor is at the determined torque level.

18 Claims, 5 Drawing Sheets

(56) References Cited

U.S. PATENT DOCUMENTS

| | | | |
|---|---|---|---|
| 2007/0282491 A1* | 12/2007 | Cox | B64C 25/40 |
| | | | 701/3 |
| 2011/0198439 A1 | 8/2011 | Rotger et al. | |
| 2012/0168557 A1 | 7/2012 | Edelson et al. | |
| 2013/0110336 A1* | 5/2013 | Braier | B60K 6/46 |
| | | | 701/22 |
| 2015/0005988 A1 | 1/2015 | Cox | |
| 2015/0175257 A1 | 6/2015 | Gorce et al. | |
| 2016/0197565 A1* | 7/2016 | Kaeser | B60L 3/0023 |
| | | | 318/490 |
| 2016/0200428 A1* | 7/2016 | Morris | B60T 8/1703 |
| | | | 244/50 |

OTHER PUBLICATIONS

European Search Report dated Dec. 7, 2016 EP Application No. 16275098.

* cited by examiner

METHODS AND CONTROL SYSTEMS FOR CONTROLLING A DRIVE SYSTEM OF AN AIRCRAFT

RELATED APPLICATIONS

The present application claims priority from Great Britain Application Number 1512196.5, filed Jul. 13, 2015, the disclosure of which is hereby incorporated by reference herein in its entirety.

FIELD OF THE INVENTION

The present invention methods and control systems for controlling a drive system of an aircraft. More particularly, but not exclusively, the invention concerns the control of an electrical drive system installed on an aircraft landing gear, using a desired power level for the drive system.

BACKGROUND OF THE INVENTION

The taxiing of aircraft while on the ground is conventionally performed using thrust provided by the engines of the aircraft. However, it can be desirable to provide thrust through a wheel drive taxi system; in other words, an aircraft with landing gear incorporating drive motors, which drive the wheels to move the aircraft while it is on the ground.

Control of movement of an aircraft while on the ground using the aircraft's engines is achieved by use of the engine thrust controller. In known wheel drive taxi systems, the equivalent control is achieved using a torque controller, with which the pilot (or other person controlling the aircraft) commands a percentage of available torque (i.e. turning force) to the drive motors.

However, when stationary, the torque required for movement of the aircraft to begin can vary dependent upon the operating conditions. This is because the "breakaway resistance" of the aircraft will vary dependent upon various factors, such as the aircraft mass (which varies depending for different loads), centre of gravity, weather conditions, runway conditions (e.g. dry, wet, icy, sandy, rough, smooth), and any slope on which the aircraft is positioned, for example. When the torque is not sufficient to initiation movement of the aircraft, damage to the drive motors may be caused. If on the other hand a large torque is commanded in order to overcome a potentially large breakaway resistance, this can lead to undesirable "jerking" of the aircraft as movement is initiated.

The present invention seeks to mitigate the above-mentioned problems. Alternatively or additionally, the present invention seeks to provide improved methods and control systems for controlling a drive system of an aircraft.

SUMMARY OF THE INVENTION

In accordance with a first aspect of the invention, there is provided a method of controlling a drive system of an aircraft, wherein the drive system comprises a drive motor arranged to drive at least one wheel of the aircraft landing gear, the method comprising the steps of:
receiving a power signal indicative of a power level for the drive motor;
receiving a speed signal indicative of a rotation speed of the drive motor;
determining a torque level for the drive motor using the power signal and the speed signal;
driving the drive motor such that the torque generated by the drive motor is at the determined torque level.

By using a power level to determine how the motor is driven, this causes a higher level of torque to be used at lower rotation speeds for any given power level, as torque=power/rotation speed. This means that a sufficiently high level of torque should always be provided to overcome the aircraft's breakaway resistance (assuming it is within the operating capabilities of the drive motor), as at very low rotation speeds a very high torque level will be required in order to provide the power level indicated. However, as the aircraft begins to move the rotation speed will increase, meaning that a lower level of torque is provided to give the same power level. This avoids "jerking" of the aircraft, as the torque level will reduce as the aircraft begins to move even if the power level indicated is unchanged. This is in contrast to the situation when the drive motors are driven at a fixed torque level, in which case jerking will often occur.

The torque level may be determined by dividing the power level indicated by the power signal by the rotation speed indicated by the speed signal. Alternatively, the torque level may be determined using a calculation based on dividing the power level indicated by the power signal by the rotation speed indicated by the speed signal, but with further additional refinements.

Preferably, the torque level is at most a predefined maximum torque level. This may be the maximum torque level specified for the drive motor, i.e. the maximum torque level the drive motor is able to deliver.

Preferably, the torque level is, if non-zero, at least a predefined minimum torque level. This may be a minimum torque level specified for the drive motor.

Advantageously, the torque level is increased over time by at most a predefined maximum torque rate. This further helps to provide smooth movement of the aircraft when there are large changes in the power level indicated for the drive motor. It also helps to provide smooth movement when the rotation speed of the drive motor changes, particularly at very low rotation speeds.

Preferably, if the rotation speed indicated by the speed signal is below a predefined minimum rotation speed, the torque level is determined using the predefined minimum rotation speed. This prevents "spikes" occurring in the determined torque level when the rotation speed is very low.

Preferably, the power level indicated by the power signal is a percentage of a predefined maximum power level.

The rotation speed indicated by the speed signal may be determined from sensors on the drive motor. Alternatively and/or additionally, the rotation speed indicated by the speed signal may be determined from the operating properties of the drive motor.

In accordance with a second aspect of the invention, there is provided a control system for controlling an aircraft wheel drive system, wherein the drive system comprises a drive motor arranged to drive at least one wheel of the aircraft landing gear, and wherein the control system is arranged to:
receive a power signal indicative of a power level for the drive motor;
receive a speed signal indicative of a rotation speed of the drive motor;
determine a torque level for the drive motor using the power signal and the speed signal;
drive the drive motor such that the torque generated by the drive motor is at the determined torque level.

The control system may be arranged to determine the torque level by dividing the power level indicated by the power signal by the rotation speed indicated by the speed signal.

Preferably, the control system is arranged to determine the torque level to be at most a predefined maximum torque level.

Preferably, the control system is arranged to determine the torque level to be, if non-zero, at most a predefined minimum torque level.

Advantageously, the control system is arranged to increase the torque level over time by at most a predefined maximum torque rate.

Preferably, the control system is arranged, if the rotation speed indicated by the speed signal is below a predefined minimum rotation speed, to determine the torque level using the predefined minimum rotation speed.

Preferably, the power level indicated by the power signal is a percentage of a predefined maximum power level.

The control system may be arranged to determine the rotation speed indicated by the speed signal using sensors on the drive motor.

In accordance with a third aspect of the invention, there is provided a computer program product arranged, when executed on a computing device of an aircraft, to provide a control system that performs any of the methods described above, or any of the control systems described above.

In accordance with a fourth aspect of the invention, there is provided an aircraft comprising a control system that performs any of the methods described above, or any of the control systems described above.

It will of course be appreciated that features described in relation to one aspect of the present invention may be incorporated into other aspects of the present invention.

DESCRIPTION OF THE DRAWINGS

Embodiments of the present invention will now be described by way of example only with reference to the accompanying schematic drawings of which.

DETAILED DESCRIPTION

Figure 1:
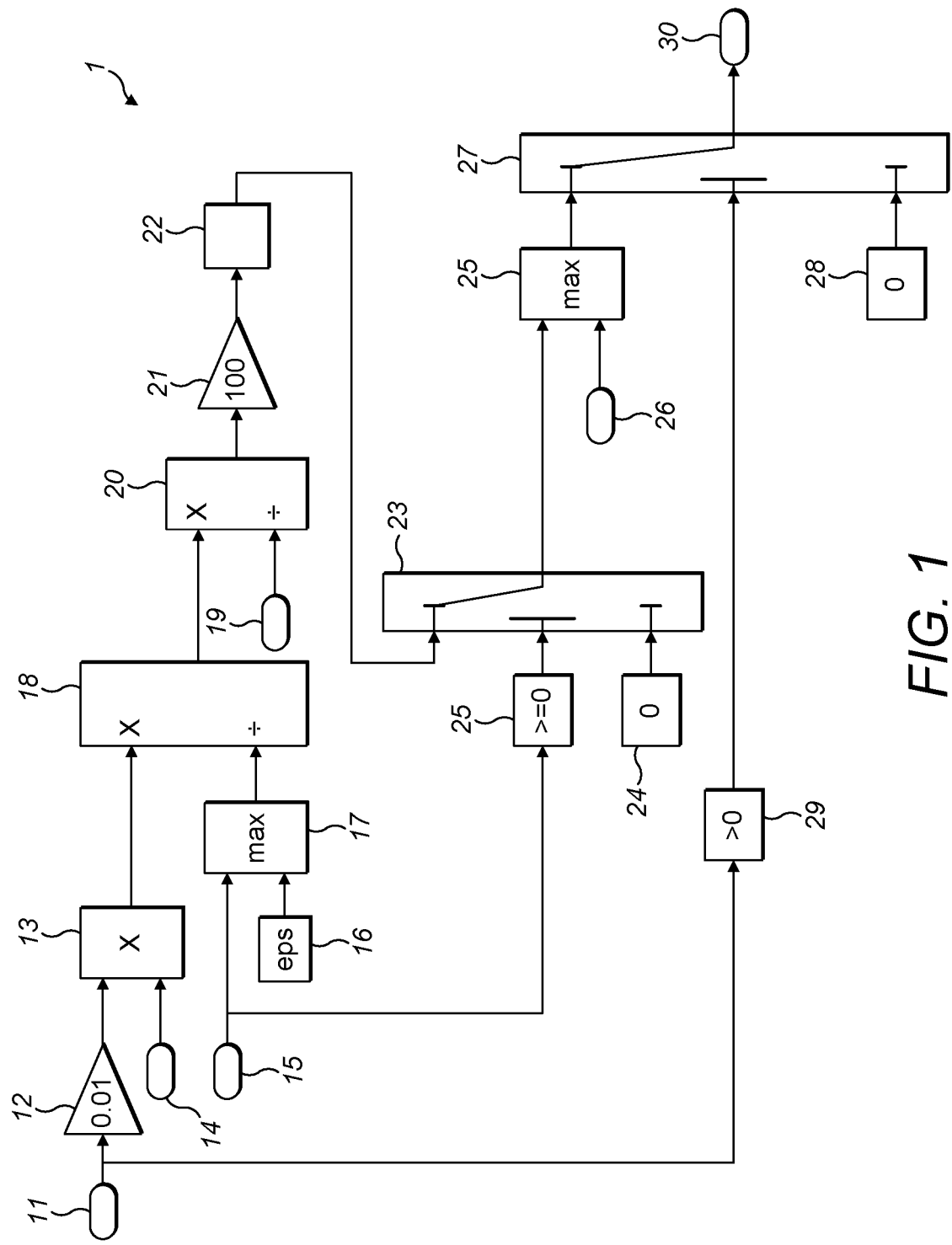
FIG. 1 is a schematic diagram of a control system for controlling an aircraft landing gear wheel drive system in accordance with an embodiment of the invention.

A control system for controlling an aircraft landing gear wheel drive system in accordance with an embodiment of the invention is now described with reference to FIGS. 1 to 4. FIG. 1 is a schematic diagram of the control system.

The control system 1 takes as input a desired power level 11, which indicates the level of power that the pilot wishes the drive motors driving the wheels of the aircraft landing gear to use. The desired power level 11 is commanded by the pilot using a power indicator, which may be a pedal, handle or the like. The desired power level 11 can range between 0 and 100, and is scaled by a first gain block 12 with a factor of 0.01 to give a value between 0 and 1. A multiplier block 14 takes as input the output of the first gain block 12 and a maximum power level 14 for the drive motor. (The maximum power level 14 is predefined as a design characteristic of the control system 1.) Consequently, the output of the multiplier block 13 will be a power level ranging from 0 to the maximum power level, as commanded by the pilot.

The control system 1 also takes as input the wheel rotation speed 15 of the wheels of the aircraft landing gear, as supplied by a tachometer or other rotation speed sensing device. A first max block 17 takes as input the wheel rotation speed 15, and also a minimum rotation speed 16. (The minimum rotation speed 16 is again a predefined value, used as discussed below to prevent "divide by zero" errors when the wheels are stationary.) Consequently, the output of the first max block 17 is the wheel rotation speed 15, or the minimum rotation speed 16 if the wheel rotation speed 15 is below the minimum rotation speed 16 (for example if the wheels are stationary so the wheel rotation speed 15 is zero).

A first divider block 18 takes as input the output of the multiplier block 13 and the first max block 17, in such a way that the output of the first divider block 18 is that of the multiplier block 13 divided by that of the first max block 17. Consequently, the output of the first divider block 18 is a desired level of torque corresponding to the desired power level 11, as torque=power/rotation speed. As the rotation speed output by the first max block 17 is at minimum the minimum rotation speed 16, this prevents "divide by zero" errors when the wheels are stationary, and ensures the desired level of torque output by the first divider block 18 stays within a suitable range at low wheel rotation speeds.

A second divider block 20 takes as input the output of the first divider block 18 and a maximum motor torque 19, in such a way that the output of the second divider block 20 is that of the first divider block 18 divided by the maximum motor torque 19. (The maximum motor torque 19 is an operating property of the drive motors of the aircraft landing gear, and is again predefined as a design characteristic of the control system 1.) In particular, the minimum rotation speed 16 and maximum power level 14 are preferably predefined at suitable levels so that the desired level of torque output by the first divider block 18 is at most the maximum motor torque 19, and so the output of the second divider block 20 is between 0 and 1. The output of the second divider block 20 is then scaled by a second gain block 21 with a factor of 100, to give a torque demand percentage value that should range between 0 and 100. The output of the second gain block 21 is passed through a rate-limiter filter block 22, which limits the rate at which the torque demand percentage value can change. The output of the second gain block 21 may also be passed through a saturation filter block (not shown), which limits the torque demand percentage value to be in the range of 0 to 100 should the minimum rotation speed 16 or maximum power level 14 be defined at values which allow that to occur.

The torque demand percentage value output by the saturation filter block 22 is passed as a selectable input to a first switch 23, which also takes an alternative selectable input a zero value 24. A non-negative check block 25 takes as input the wheel rotation speed 15, and outputs a 1 if the wheel rotation speed 15 is zero or above (i.e. the aircraft landing gear wheels are not moving backwards), and 0 if it is below zero. The output of the non-negative check block 25 is passed as the selecting input to the first switch 23, so that torque demand percentage value is selected if the wheel rotation speed 15 is zero or above, and otherwise zero.

A second max block 25 takes as input the output of the first switch 23, and a minimum torque percentage value 26.

(The minimum torque percentage value 26 is again predefined as a design characteristic of the control system 1.) Consequently, the output of the second max block 25 is the torque demand percentage value output by the saturation filter block 22, or the minimum torque percentage value 26 if the torque demand percentage value is below the minimum torque percentage value 26, or if the wheel rotation speed 15 is below zero (and so the output of the first switch 23 is zero).

The output of the second max block 25 is passed as a selectable input to a second switch 27, which also takes an alternative selectable input a zero value 28. A positive check block 29 takes as input the desired power level 11, and outputs a 1 if the desired power level 11 is above zero, and 0 if it is zero or below. The output of the positive check block 29 is passed as the selecting input to the second switch 27, so that output of the second max block 25 is selected if the desired power level 11 is above zero, and otherwise zero. The output of the second switch 27 is the torque demand percentage 30 with which the control system 1 drives the drive motors of the aircraft landing gear.

Figure 2:
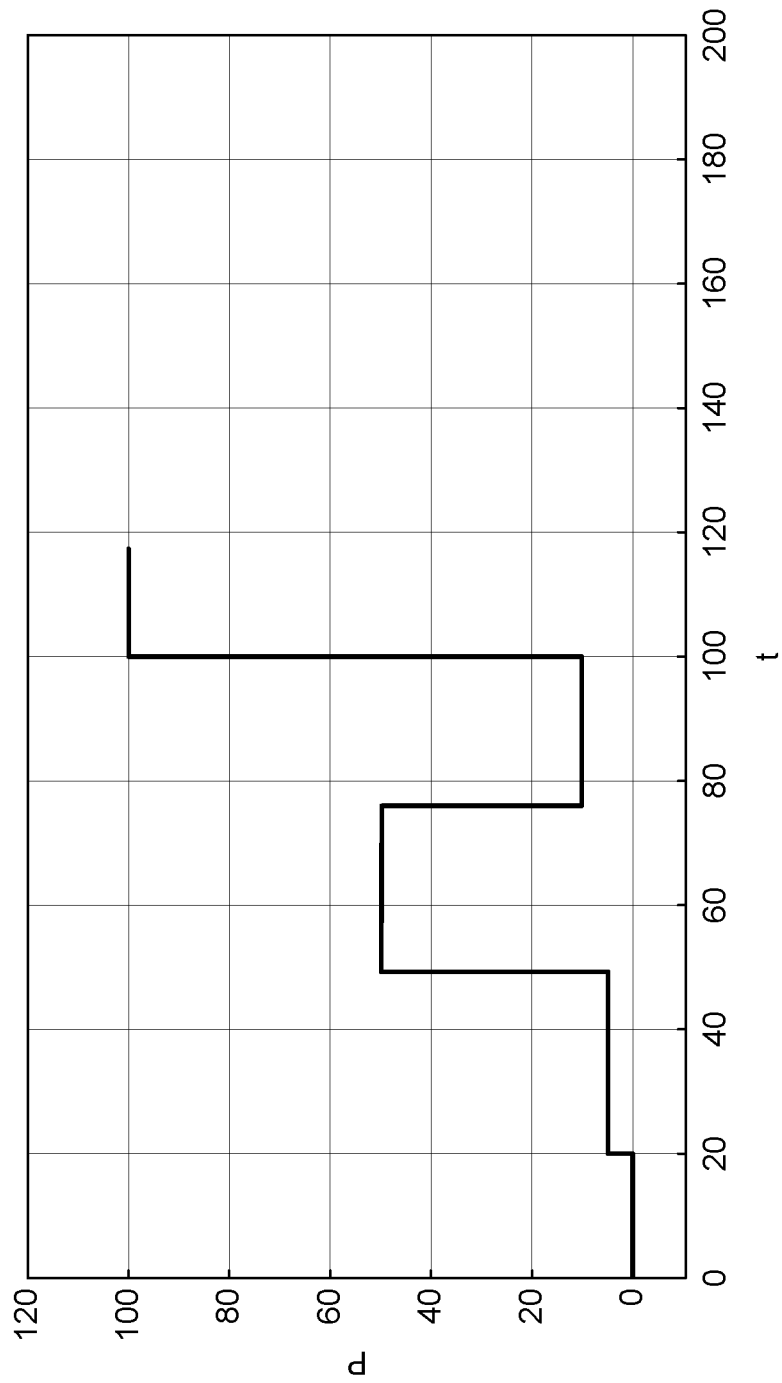
FIG. 2 is a graph showing the commanded power level for the control system of FIG. 1.

An example of the control system 1 in operation is now described with reference to FIGS. 2 to 4. FIG. 2 shows the desired power level 11 for control system 1 over time. Initially, the desired power level 11 is P=0%. At time t=20 seconds, the desired power level 11 increases to P=4%. At time t=50, the desired power level 11 increases again to P=50%. At time t=76, the desired power level 11 drops to P=10%, and then at time t=100 increases to P=100%.

Figure 3:
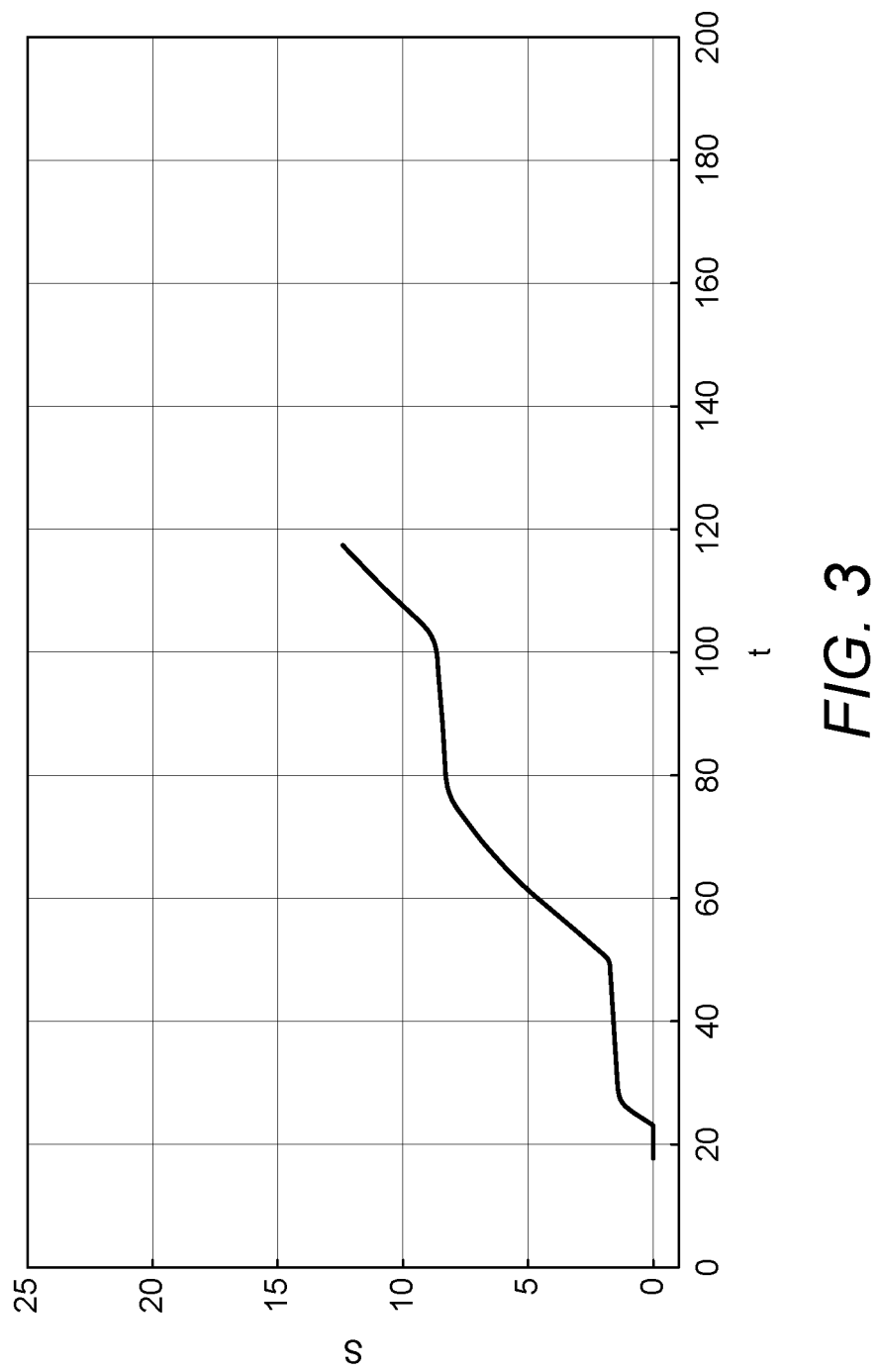
FIG. 3 is a graph showing the wheel rotation speed of the drive motor controlled by the control system of FIG. 1.
Figure 4:
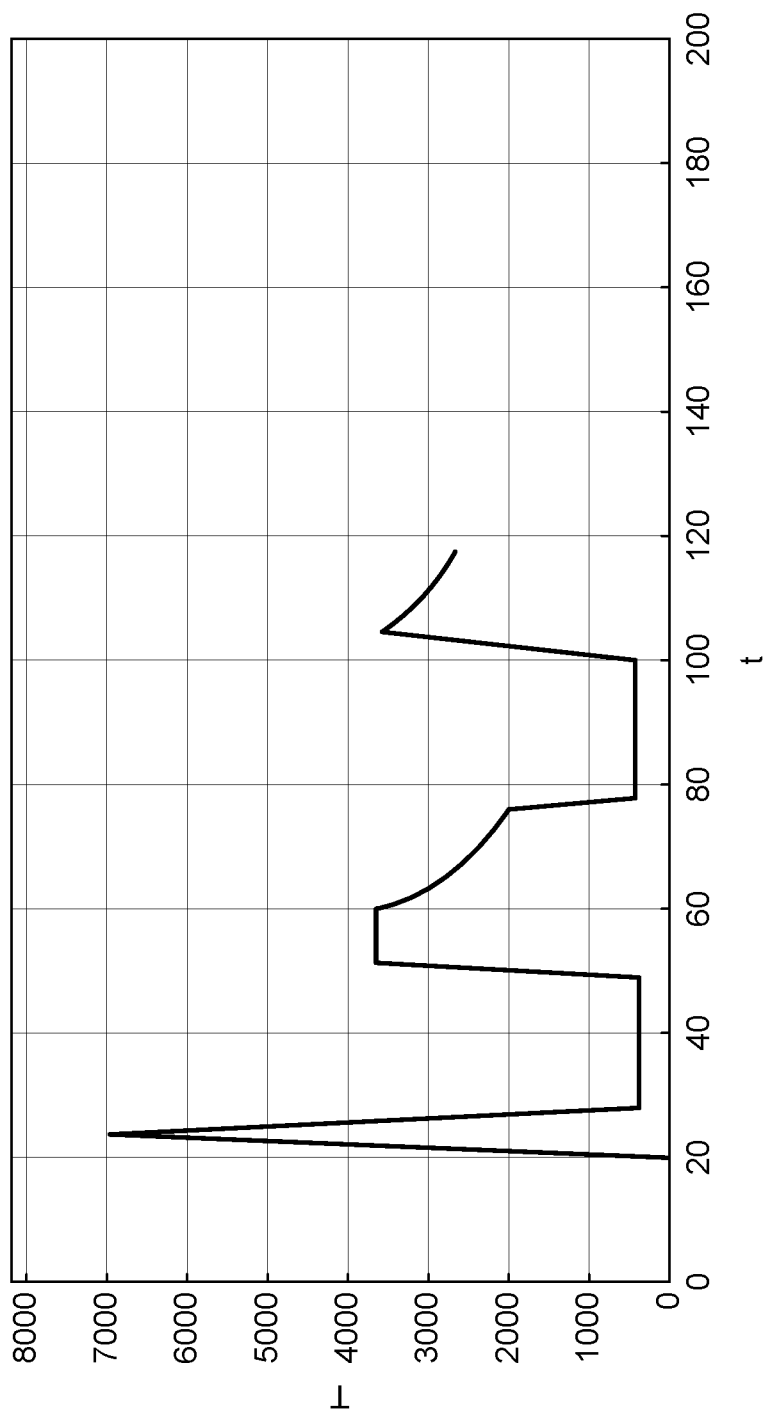
FIG. 4 is a graph showing the determined torque level for the drive motor controlled by the control system of FIG. 1.

FIG. 3 shows the corresponding wheel rotation speed of the drive motor of the aircraft landing gear, and FIG. 4 shows the corresponding torque level determined by the control system 1. Initially, the rotation speed s=0 and the torque level is T=0. At time t=20, when the desired power level 11 is increased to P=4%, the torque level increases to T=7000 at around t=24 (the rate of increase in the torque level being limited by the control system 1). At the same time, the rotation speed remains at s=0, until at around t=24 when the torque level is sufficiently high the breakaway resistance of the aircraft is overcome, and so the it begins to increase until around t=27 when it is at around s=1.5, at which point it continues to increase at a much slower rate. As can be seen in FIG. 3, once the rotation speed has increased, the torque level drops in order to maintain the same power level, until at t=27 it has dropped to the minimum torque level. At time t=45, when the desired power level 11 is increased to P=50%, the torque level increases to around T=3600, and the speed increases more quickly. At t=60 the torque level starts to drop, to maintain the power level as the speed continues to increase, to around s=8 at t=76. At t=76, when the desired power level 11 is reduced to P=10%, the toque level drops to the minimum torque level again, and the speed the increases very slowly. At t=100, when the desired power level 11 is increased to P=100%, the torque level increases rapidly and then drops slowly, to maintain the desired power level 11 as the speed increases.

Figure 5:
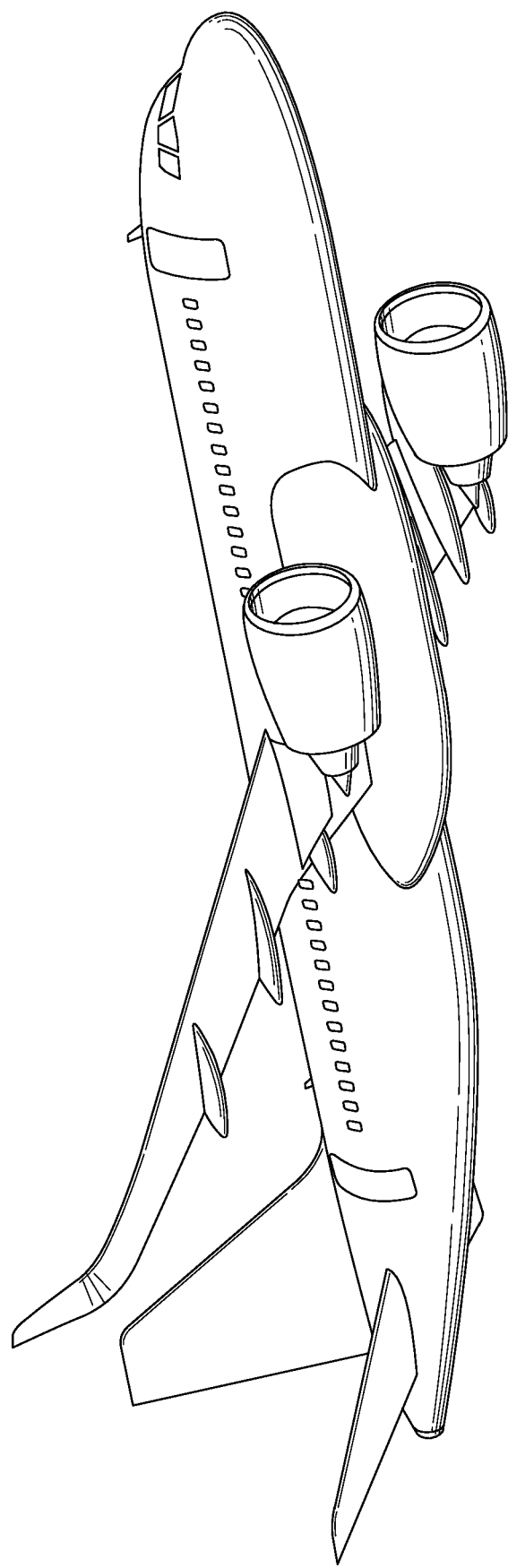
FIG. 5 is an aircraft incorporating the control system of FIG. 1.

FIG. 5 shows an aircraft 100 incorporating the control system described above.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of controlling a drive system of an aircraft, wherein the drive system comprises a drive motor arranged to drive at least one wheel of the aircraft landing gear, the method comprising the steps of:
receiving a power signal indicative of a desired power level for the drive motor such that the drive motor avoids jerking the aircraft:
receiving a speed signal indicative of a rotation speed of the drive motor;
determining a torque level for the drive motor using the desired power signal and the speed signal; and,
driving the drive motor such that the torque generated by the drive motor is at the determined torque level.

2. A method as claimed in claim 1, wherein the torque level is determined by dividing the power level indicated by the power signal by the rotation speed indicated by the speed signal.

3. A method as claimed in claim 1, wherein the torque level is at most a predefined maximum torque level.

4. A method as claimed in claim 1, wherein the torque level is, if non-zero, at least a predefined minimum torque level.

5. A method of controlling a drive system of an aircraft, wherein the drive system comprises a drive motor arranged to drive at least one wheel of the aircraft landing gear, the method comprising the steps of:
receiving a power signal indicative of a power level for the drive motor;
receiving a speed signal indicative of a rotation speed of the drive motor;
determining a torque level for the drive motor using the power signal and the speed signal;
driving the drive motor such that the torque generated by the drive motor is at the determined torque level, wherein the torque level is increased over time by at most a predefined maximum torque rate to provide smooth movement of the aircraft when there are large changes in the power level indicated for the drive motor.

6. A method as claimed in claim 1, wherein if the rotation speed indicated by the speed signal is below a predefined minimum rotation speed, the torque level is determined using the predefined minimum rotation speed.

7. A method as claimed in claim 1, wherein the power level indicated by the power signal is a percentage of a predefined maximum power level.

8. A method as claimed in claim 1, wherein the rotation speed indicated by the speed signal is determined from sensors on the drive motor.

9. A control system for controlling an aircraft wheel drive system, wherein the drive system comprises a drive motor arranged to drive at least one wheel of the aircraft landing gear, and wherein the control system is arranged to:

receive a power signal indicative of a desired power level for the drive motor such that the drive motor avoids jerking the aircraft;
receive a speed signal indicative of a rotation speed of the drive motor;
determine a torque level for the drive motor using the desired power signal and the speed signal; and,
drive the drive motor such that the torque generated by the drive motor is at the determined torque level.

10. A control system as claimed in claim 9, arranged to determine the torque level by dividing the power level indicated by the power signal by the rotation speed indicated by the speed signal.

11. A control system as claimed in claim 9, arranged to determine the torque level to be at most a predefined maximum torque level.

12. A control system as claimed in claim 9, arranged to determine the torque level to be, if non-zero, at most a predefined minimum torque level.

13. A control system as claimed in claim 9, arranged to increase the torque level over time by at most a predefined maximum torque rate to provide smooth movement of the aircraft when there are large changes in the power level indicated for the drive motor.

14. A control system as claimed in claim 9, arranged, if the rotation speed indicated by the speed signal is below a predefined minimum rotation speed, to determine the torque level using the predefined minimum rotation speed.

15. A control system as claimed in claim 9, wherein the power level indicated by the power signal is a percentage of a predefined maximum power level.

16. A control system as claimed in claim 9, arrange to determine the rotation speed indicated by the speed signal using sensors on the drive motor.

17. An aircraft comprising: an aircraft wheel drive system;
a control system for controlling the aircraft wheel drive system; wherein the drive system comprises a drive motor arranged to drive at least one wheel of the aircraft landing gear, and wherein the control system is arranged to:
receive a power signal indicative of a desired power level for the drive motor such that the drive motor avoids jerking the aircraft;
receive a speed signal indicative of a rotation speed of the drive motor;
determine a torque level for the drive motor using the desired power signal and the speed signal; and,
drive the drive motor such that the torque generated by the drive motor is at the determined torque level.

18. A method as claimed in claim 1, wherein the torque level is increased over time by at most a predefined maximum torque rate to provide smooth movement of the aircraft when there are large changes in the power level indicated for the drive motor.

* * * * *